Campbell & Cole,
Boring Artesian Wells.

No. 48,515.  Patented July 4, 1865.

UNITED STATES PATENT OFFICE.

MALCOLM CAMPBELL AND JOB H. COLE, OF PHILADELPHIA, PA.

IMPROVEMENT IN MACHINES FOR BORING WELLS, &c.

Specification forming part of Letters Patent No. 48,515, dated July 4, 1865.

*To all whom it may concern:*

Be it known that we, MALCOLM CAMPBELL and JOB H. COLE, of the city and county of Philadelphia, and State of Pennsylvania, have invented certain new and useful Improvements in Machines for Drilling Artesian and other Wells; and we do hereby declare that the following is a full, clear, and exact description of the same, reference being had to the accompanying drawings, making a part of this specification, in which—

Figure 1:
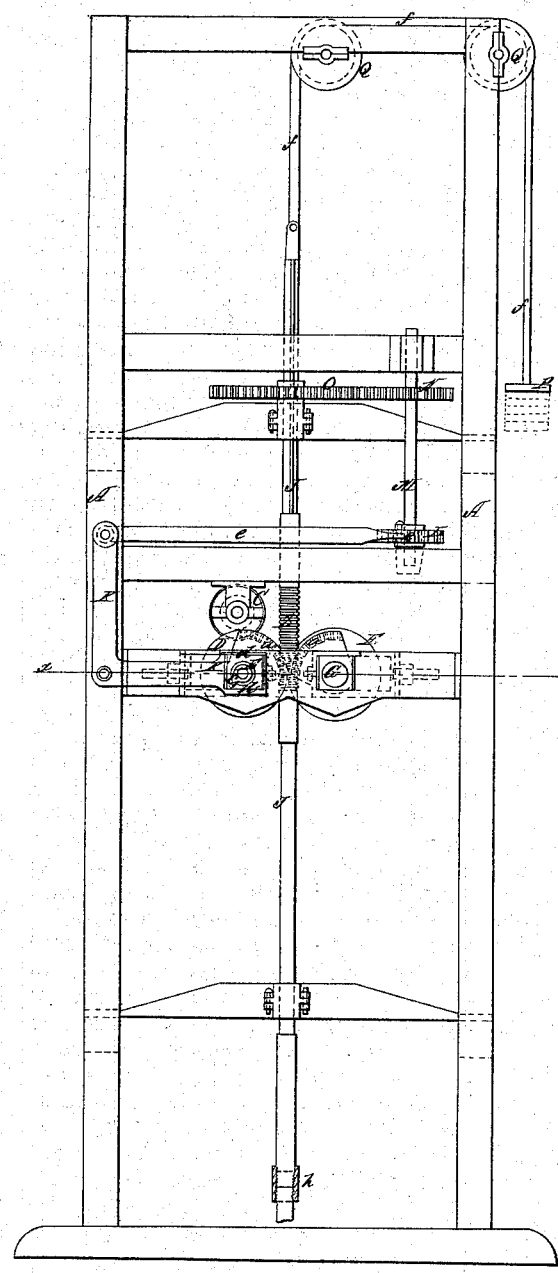
Figure 2:
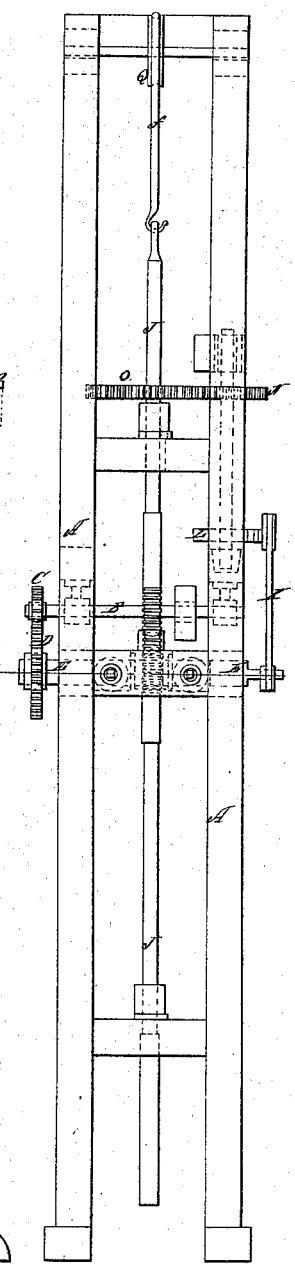
Figure 3:
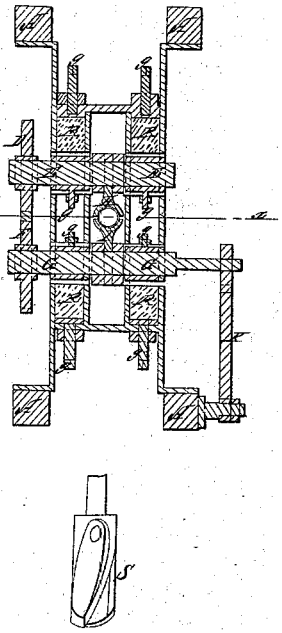

Figure 1 represents an elevation from one of the sides of the machine. Fig. 2 represents an elevation from one of its ends; and Fig. 3 represents a horizontal section through the machine, taken at the red line $x\ x$, shown on the drawings.

Similar letters of reference, where they occur in the separate figures, denote like parts of the machine in all the drawings.

We are aware that many devices for lifting and tripping a drill in drilling-machines have been essayed; but ours differs from any of which we have knowledge in the fact that it takes a firm unyielding hold upon the drill-stock to raise it, while it is as free and quick to drop the drill after it has been raised as any of those that carry the drill-stock by friction only.

Our invention consists in corrugating the drill-stock and the lifting-cams where they come in contact with the drill-stock, so that the lift is a positive one and the release just as efficient as though the lifting were by friction.

To enable others skilled in the art to make and use our invention, we will proceed to describe the same with reference to the drawings.

A represents a frame on which the machinery is supported.

B is a shaft turned by a crank, belt-wheel, or in any other manner, and carries a gear-wheel, C, that turns another gear, D, on a shaft, E. The gear D works into and turns a gear, F, on a shaft, G, which is parallel to the shaft E. Upon these two shafts E G are placed, respectively, the lifting-cams H I, which turn toward each other, and when they meet, or nearly so, they grasp and raise up the drill-stock J, and as they continue to turn they release it and allow it to fall. These cams H I have serrations or indentations made in their curved faces or perimeters, and the drill-stock J is also serrated, indented, or corrugated, so that the cams shall have an unyielding hold upon the drill-stock. These roughened surfaces are shown at $a\ b$. On one end of the shaft E there is a cam, $c$, that works in a yoke, $d$, on the end of a pivoted bell-crank lever, K, and to this bell-crank is connected a dog or pawl, $e$, that works into and turns a ratchet-wheel, L, arranged on a shaft, M. On the top of this shaft M there is a gear, N, that works in and turns a larger gear-wheel, O. The drill-stock J passes through the hub of the wheel O, and is fitted thereto by a feather and pin, so that while the drill-stock may rise and fall independent of the cog-wheel O, yet the cog-wheel will gradually turn the drill in the hole being cut to keep it round. The drill-stock has a counterpoise-weight, P, connected to it by means of a cord or chain, $f$, running over pulleys Q Q', to aid in raising up the drill when, by its great length, it becomes very heavy, and this counterpoise can be varied to suit the length and weight of drill-stock that is to be raised. The bearings of the shafts E G are so arranged with rubber R behind them as to yield to any undue strain, and set-screws $g$ are arranged at the front and rear of the boxes or bearings, to adjust them and the cams which the shafts, supported in them, carry. The drill-stocks are united by a screw-sleeve, $h$, the rods being simply butted against each other. This plan saves the threads from being stripped or injured, as they are when screwed together socket fashion; and they may be hollow for pumping the débris through.

The drill S may have any suitable number of cutting-edges, which may radiate from its center. These cutting-edges are beveled off at different angles—that is, more abrupt on one side than on the other, so that the blow of the drill will aid it in turning. The counterpoise, besides aiding to raise the drill, equalizes the force of its descent when, by its great length, it becomes very heavy. The roughened contact-surfaces of the cams and drill-stock make their action as certain as cogged gears, without the danger incident to the latter from failing to gear with certainty.

Having thus fully described our invention, what we claim therein is—

1. Corrugating or otherwise indenting the contact-surfaces of the lifting-cams and drill-stock, so that the lifting will be positive and without liability to slip, substantially as described.

2. Hanging the lifting cam-shafts in adjustable and self-yielding boxes or bearings, as and for the purpose described.

3. In combination with the drill-stock and its lifting-cams, the counterpoise P, for aiding in raising the drill when, from its extreme length, it becomes very heavy, and to equalize the force with which it falls, substantially as described.

MALCOLM CAMPBELL.
JOB H. COLE.

Witnesses:
A. B. STOUGHTON,
EDM. F. BROWN.